United States Patent [19]
Farrell et al.

[11] Patent Number: 5,692,635
[45] Date of Patent: Dec. 2, 1997

[54] EASY OPEN CLOSURE

[75] Inventors: Christopher J. Farrell, Arlington Hts., Ill.; Les Kaffko, Crystal Lake, Ill.; Guy Richards, Osh Kosh, Wis.

[73] Assignee: American National Can Company, Chicago, Ill.

[21] Appl. No.: 722,484

[22] Filed: Sep. 27, 1996

Related U.S. Application Data

[63] Continuation of Ser. No. 563,858, Nov. 29, 1995, abandoned, which is a continuation of Ser. No. 270,802, Jul. 5, 1994, abandoned, which is a continuation of Ser. No. 835,244, Feb. 12, 1992, abandoned, which is a continuation-in-part of Ser. No. 534,200, Jun. 6, 1990, abandoned.

[51] Int. Cl.$^6$ ............................................. B65D 17/34
[52] U.S. Cl. ................ 220/270; 220/276; 220/319; 220/359
[58] Field of Search ................ 220/268, 270, 220/276, 319, 320, 359

[56] References Cited

U.S. PATENT DOCUMENTS

| | | |
|---|---|---|
| Re. 31,759 | 12/1984 | Ingemann . |
| D. 296,191 | 6/1988 | Yoshida et al. . |
| D. 313,556 | 1/1991 | Smith . |
| 1,789,788 | 1/1931 | Sundquist . |
| 2,034,007 | 3/1936 | Smith . |
| 2,443,984 | 6/1948 | Hills . |
| 2,973,087 | 2/1961 | Rohdin . |
| 3,192,091 | 6/1965 | Hey et al. . |
| 3,202,271 | 8/1965 | Kirk . |
| 3,217,871 | 11/1965 | Lee . |
| 3,415,412 | 12/1968 | Robinson et al. . |
| 3,547,338 | 12/1970 | Hemmes . |
| 3,701,453 | 10/1972 | Platt et al. ............... 220/270 |
| 3,717,533 | 2/1973 | Mayworm et al. . |
| 3,754,700 | 8/1973 | Bonk . |
| 3,783,089 | 1/1974 | Hurst et al. . |
| 3,864,892 | 2/1975 | Molvar . |
| 3,946,896 | 3/1976 | Lemelson . |
| 3,954,174 | 5/1976 | Kraus . |
| 4,044,941 | 8/1977 | Knudsen . |
| 4,076,790 | 2/1978 | Lind . |
| 4,091,930 | 5/1978 | Buchner et al. . |
| 4,109,815 | 8/1978 | Collins, III . |
| 4,137,333 | 1/1979 | Daswick . |
| 4,146,148 | 3/1979 | Dwinell et al. ................ 220/270 |
| 4,165,004 | 8/1979 | Bartels . |
| 4,207,989 | 6/1980 | Ingemann . |
| 4,211,338 | 7/1980 | Bublitz . |
| 4,212,409 | 7/1980 | Jeppsson ......................... 220/276 |
| 4,267,937 | 5/1981 | Piltz et al. . |
| 4,328,905 | 5/1982 | Hardt . |
| 4,333,585 | 6/1982 | Del Bon ........................... 220/359 |
| 4,350,263 | 9/1982 | Hoffman . |
| 4,360,121 | 11/1982 | Helms ............................ 220/270 |
| 4,401,229 | 8/1983 | Bell et al. . |
| 4,407,897 | 10/1983 | Farrell et al. ................ 428/516 |
| 4,425,410 | 1/1984 | Farrell et al. ................ 428/516 |
| 4,461,605 | 7/1984 | Stanek et al. . |
| 4,529,100 | 7/1985 | Ingemann . |
| 4,553,679 | 11/1985 | Hatakeyama . |
| 4,659,405 | 4/1987 | Walter . |
| 4,693,391 | 9/1987 | Roth . |
| 4,738,374 | 4/1988 | Ingemann .................... 220/258 |
| 4,810,541 | 3/1989 | Newman et al. . |
| 4,834,247 | 5/1989 | Oshima et al. . |
| 4,840,289 | 6/1989 | Fait et al. ..................... 220/359 |

(List continued on next page.)

FOREIGN PATENT DOCUMENTS

| | | |
|---|---|---|
| 0001094 | 3/1979 | European Pat. Off. . |
| 2361800 | 6/1975 | Germany ......................... 220/276 |
| 3842523 | 6/1990 | Germany . |

*Primary Examiner*—Stephen Cronin
*Attorney, Agent, or Firm*—Mary J. Schnurr

[57] ABSTRACT

A package comprising a container, a closure assembly which includes a tearing portion. The container includes a sidewall, a closed end and an end with an opening. The closure assembly includes a central panel covering the container opening and a circumferential edge secured to the container. The tearing portion allows the closure to be opened for access to the contents of the package.

41 Claims, 11 Drawing Sheets

U.S. PATENT DOCUMENTS

| | | | |
|---|---|---|---|
| 4,890,758 | 1/1990 | Gailus . | |
| 4,988,013 | 1/1991 | Kobayashi et al. | 220/276 |
| 5,054,641 | 10/1991 | Sato | 220/270 |
| 5,054,642 | 10/1991 | Yoshida | 220/276 |
| 5,059,360 | 10/1991 | Sato | 264/23 |
| 5,085,339 | 2/1992 | Roth et al. | 220/269 |
| 5,103,973 | 4/1992 | Sato | 220/270 |
| 5,145,085 | 9/1992 | Yost | 220/269 |

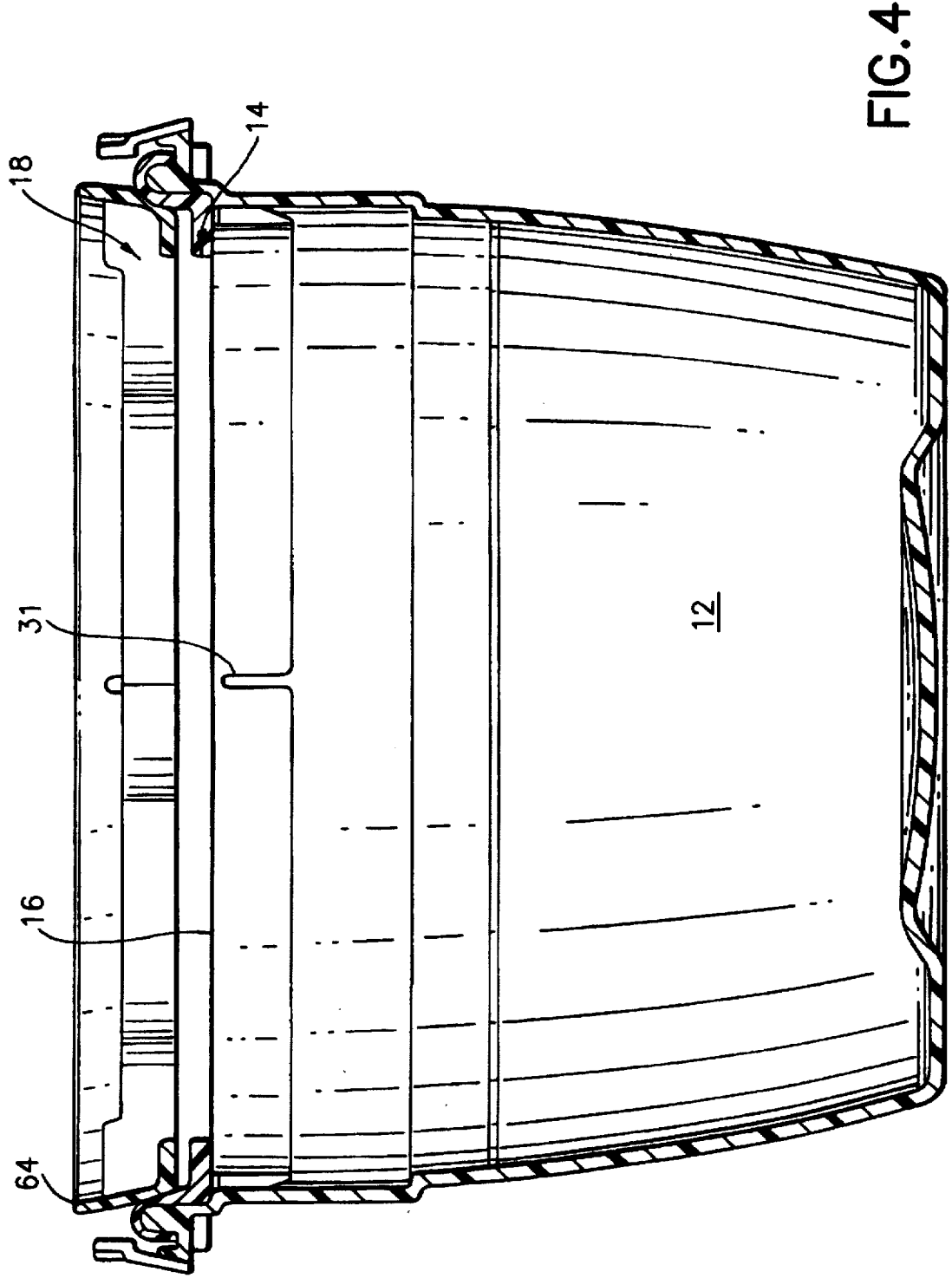

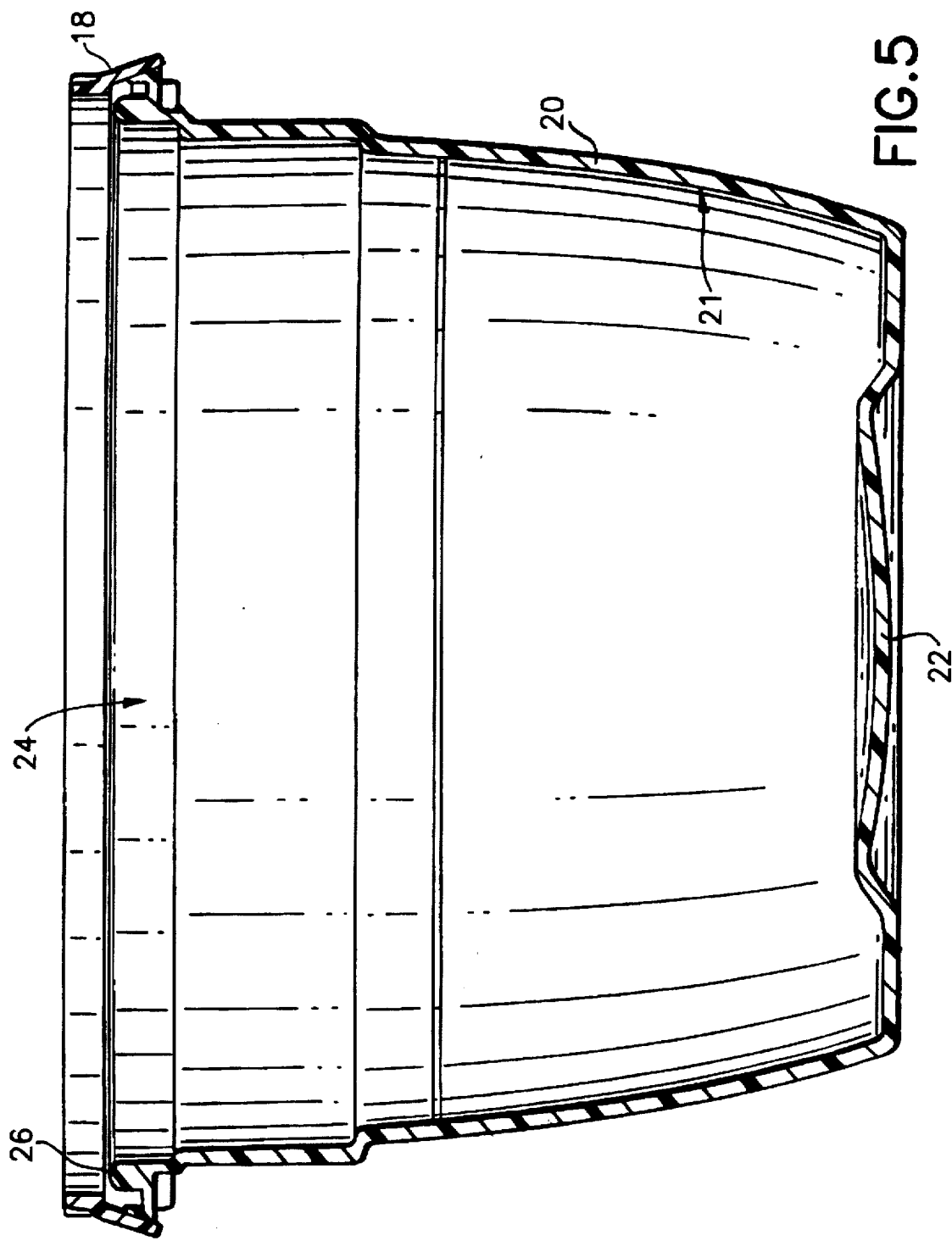

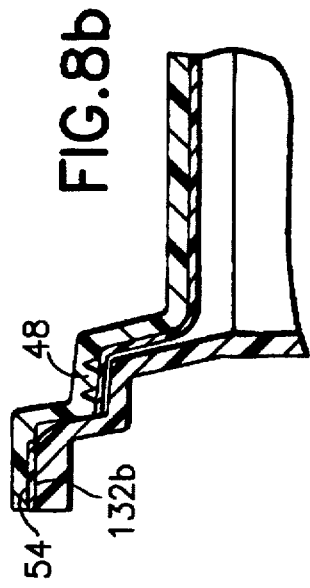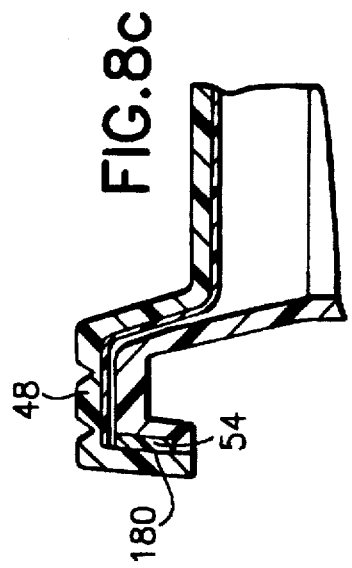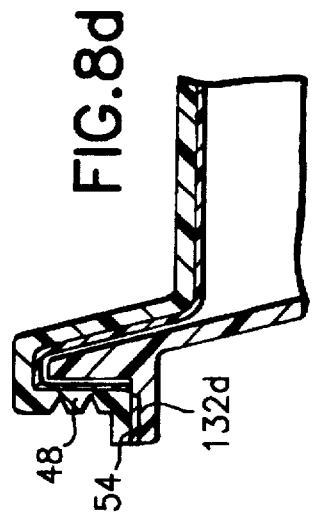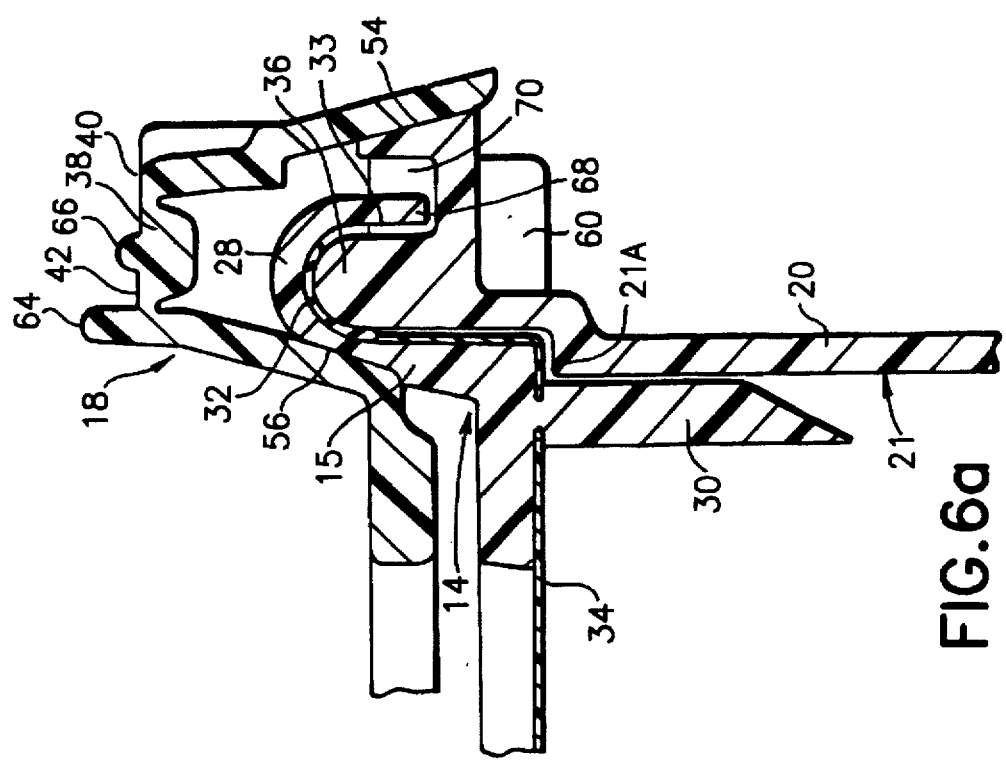

EASY OPEN CLOSURE

This Application is a continuation of U.S. patent application Ser. No. 08/563,858 filed Nov. 29, 1995, now abandoned, which is a continuation of U.S. patent application Ser. No. 08/270,802 filed Jul. 5, 1994, now abandoned, which is a continuation of U.S. patent application Ser. No. 07/835,244 filed Feb. 12, 1992, now abandoned, which is a continuation in part of U.S. patent application Ser. No. 07/534,200 filed Jun. 6, 1990, now abandoned.

BACKGROUND OF THE INVENTION

This invention relates to an easily opened closure suitable for use with a container which includes a layer of plastic. The closure may be of a multi-layer construction or may include a layer of barrier material. If an all-plastic closure is used with an all-plastic container, the container and closure assembly is especially suitable for microwaving.

This application is a continuation-in-part of U.S. Ser. No. 07/534,200, which is herein incorporated by reference. Both applications are owned by the same assignee.

Microwavable containers are growing in popularity because they not only replace the storage function of the traditional can, but also enable the consumer to heat the contents in the container and to eat from the container.

In the prior art, closures for microwavable containers generally included both a double seamed metal lid and a plastic overcap. The metal lid is double seamed onto the all-plastic container and has a score line in the metal lid. To open the metal lid, the consumer has to pull hard enough to break the metal score line and in doing so often splatters the food from the container. Additionally, a residual rim of metal remains affixed to the top edge of the container after opening and removing the lid. The overcap is then snapped over the remaining rim and the container and overcap are placed in the microwave.

The residual metal rim of the prior art container is undesirable because it has a sharp edge, making it prone to cut the fingers of those using the containers, especially children for whom the microwavable containers are particularly convenient.

The residual metal also makes recycling the container more difficult. While it is theoretically possible to recycle such containers, there is presently no system which provides for recycling of mixed plastic and metal containers. Neither is there a widespread recycling service that collects such containers. By providing an all-plastic closure for use with an all-plastic container, both closure and container will be recyclable as plastic. There are a number of technologies which use such recycled plastic in an interior layer of a container. Additionally, the code requirements for such plastics and recycling centers for such plastics are generally established.

The prior art closure system also requires a large number of consumer steps for using the container: removing the overcap, opening the metal lid, replacing the overcap, placing the container in the microwave oven, heating the container and contents in the microwave oven, and removing the cap to gain access to the food.

The overcap of the prior art has a number of characteristics necessary so that it can be used with a microwavable container. The center panel of the overcap is raised well above the top of the metal lid. A number of holes are punched in the center of the lid, and the overcap is sized so that it fits tightly with the outside of the container.

These modifications are required because of the unique way in which the microwave oven heats food in containers. The food is generally filled to the top of a microwavable container, making the raised overcap necessary to accommodate expansion of the food caused by steam bubbles. The holes in the lid allow for steam venting. Microwave heating causes explosive boiling in the food which creates splattering and can be so violent as to physically move the container. This is a type of localized superheating which does not occur in conventional cooking where heating is by conduction. The conventional stovetop cooking causes a more uniform, gentle heating which is unlikely to produce explosions.

The overcap of the prior art must be tight-fitting to reduce the likelihood of explosions causing it to blow off of the container. However, this also makes removal of the lid more difficult, especially for elderly persons and young children.

Other types of prior art closures included thermoplastic material molded onto composite materials, such as shown in U.S. Pat. No. 4,456,146. However, such container assemblies do not address the problems involved with microwave heating an open container, as will be discussed later.

This invention solves these problems of the prior art microwavable containers and closures. While the closure and container are particularly beneficial for a package intended to be microwaved, the easy-open features are useful for a wide variety of food containers, including shelf stable foods; retortable packages; hot filled products, such as juice; or frozen foods, such as for juice concentrate. The container may be of a bowl shape, such as shown in the detailed embodiments herein, or of any other suitable shape, for example, a tapered cylinder.

SUMMARY OF THE INVENTION

This invention is embodied in an easy-open closure which can be affixed to a container which is suitable for any number of food packaging applications, such as shelf stable, frozen, retortable or microwave. If the closure and container are all-plastic, as discussed relating to the following embodiments, the package is ideal for microwave applications. These embodiments may have to be modified somewhat for some of the other applications.

For a microwavable container, after the closure is opened, the closure can be left in position to prevent splattering when the container and contents are heated. This eliminates the need for the overcap used in the prior art microwavable packages.

A first embodiment utilizes a central panel and a ring which surrounds the peripheral edge of the central panel and the container sidewall. A tear strip is positioned within the ring. The central panel is recessed and fits loosely within the mouth of the container.

A second embodiment uses a unitary plastic closure which includes a central portion that covers the opening of the container and a ring portion that is affixed to the container sidewall. A tear-strip forms a complete circle within the closure inwardly from the peripheral edge of the lid. The lid is recessed and fits loosely within the container.

After the tear-strip is removed, the closure of this invention remains on the container and serves to prevent splattering during heating. Thus the tear-strip allows one closure to replace both the overcap and the metal seamed lid of the prior art.

A third embodiment includes a central panel and a ring which surrounds the peripheral edge of the central panel and the container sidewall, and is secured to both. The central panel includes a full panel easy open end to provide access to the contents of the container.

Unlike the tightly fitting prior art overcap, the embodiments of the closure described herein may be sized to fit loosely within the mouth of the container. Thus, after the closure is opened but remains in position on the container, the closure is free to bob up and down during heating in the microwave. The closure releases steam easily around its periphery instead of through central holes as does the prior art overcap.

The closure may be recessed to such an extent that upon opening the closure and the closure center panel remaining positioned on the container, the food touches the central panel or a downward extension of the panel. However, the extent of recess should be sufficiently large so that the food expansion will not push the lid completely out of the mouth of the container.

This invention also reduces the number of steps required by the consumer. The consumer simply removes the tear-strip and places it in the microwave oven. After microwaving, the consumer removes the lid to eat the contents. Not only is this method more convenient for the consumer but also cleaner since it eliminates splattering when preparing the container for microwaving.

BRIEF DESCRIPTION OF THE DRAWINGS

FIG. 4 is a cross-sectional view of the first embodiment of the container and closure with the tearing portion removed, and the closure remaining in position on the container.

FIG. 5 is a cross-sectional view of the first embodiment of the container and closure with the closure opened via the tearing portion, and the closure removed.

FIG. 6a is a cross-sectional view showing the preferred tear-strip and sealing locations of the first embodiment.

FIGS. 8b, 8c, 8d are cross-sectional views of alternative container and closure sealing configurations of the second embodiment.

DETAILED DESCRIPTION OF THE ILLUSTRATED EMBODIMENTS

Figure 1:
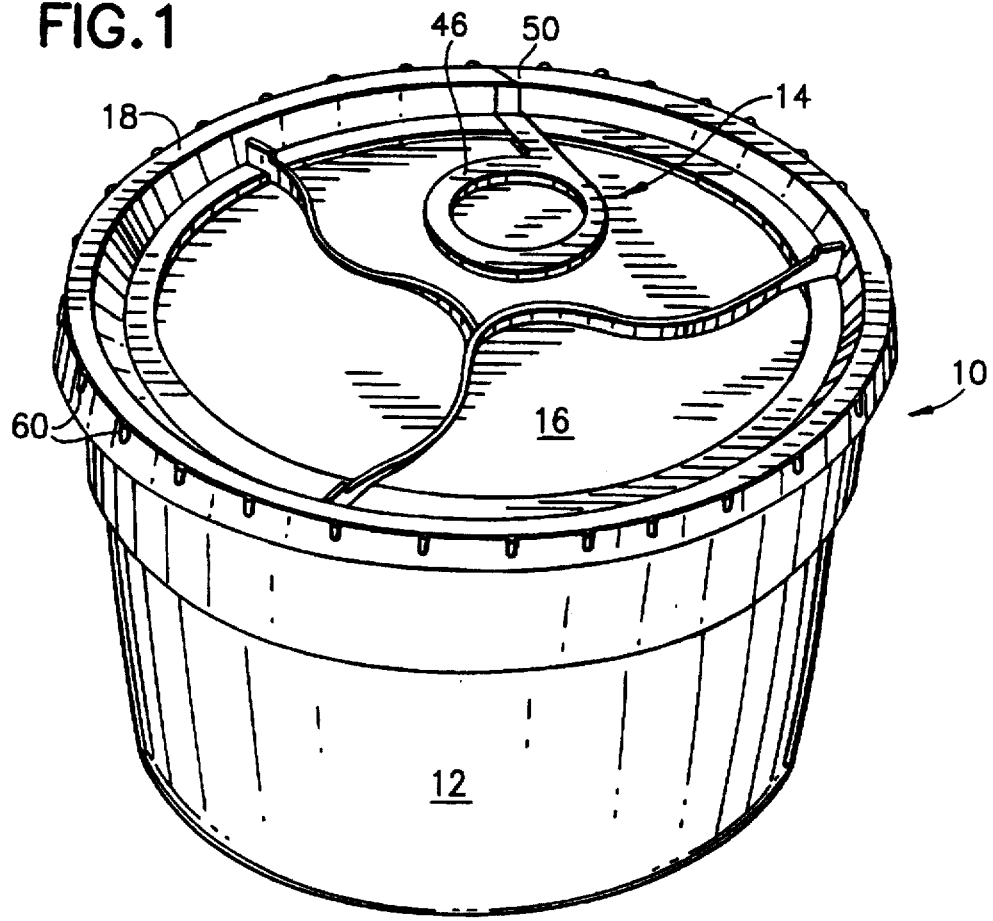
FIG. 1 is a perspective view of a first embodiment of the container and closure that is the subject of this invention.
Figure 2:
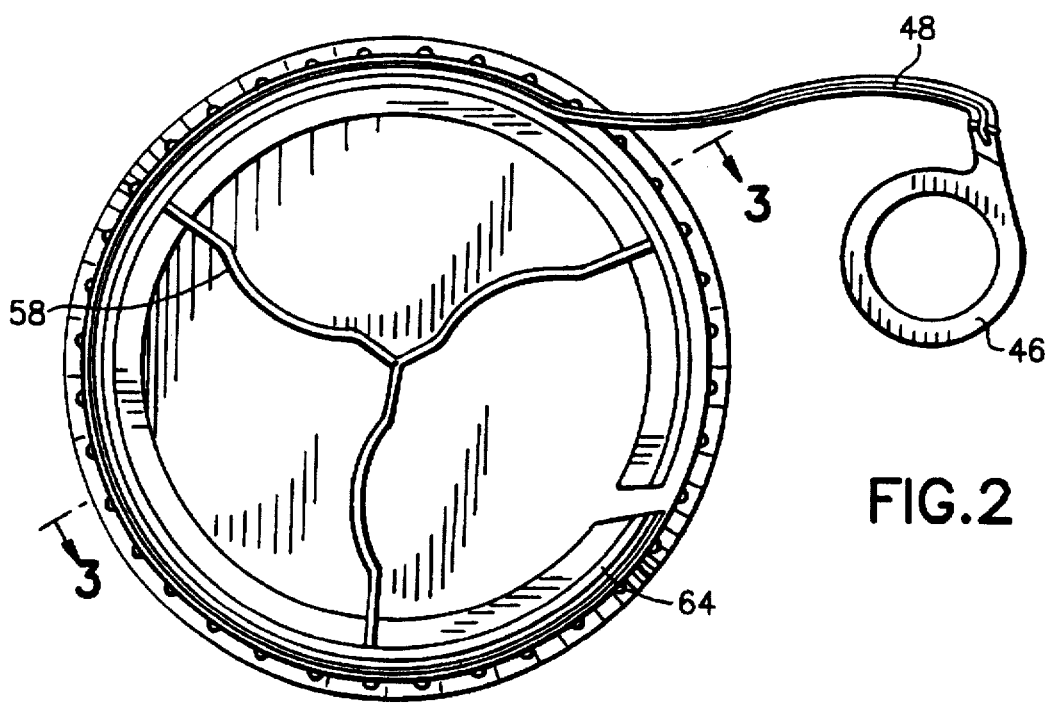
FIG. 2 is a top view of the first embodiment of FIG. 1 with the tearing initiated.

FIG. 1 shows a food package, generally indicated as 10, which is the first embodiment of this invention. The package 10 includes a container 12, a closure 14 and a ring 18.

The container 12 may be any container suitable for holding food, such as the bowl shaped container shown herein, a tapered cylinder, a tray, and may have a cross-section of any shape. The container 12 may be manufactured by any appropriate process, such as thermoforming, injection molding, or injection blow molding, and may be single layer or multi-layer. The container as described herein shall refer to a high barrier microwavable container, although it shall be understood that any suitable container may be used in this invention.

The preferred container 12 is a multi-layer, high barrier, injection blow molded container consisting of five or more layers. The inner and outer layers of the container 12 are for structural integrity, and may be made of polypropylene (hereafter "PP") or preferably of a polypropylene/polyethylene blend (hereafter "PP-PE Blend"). The preferred structure also includes a central layer of oxygen barrier polymer, such as ethylene vinyl alcohol copolymer (hereafter "EVOH") and two adhesive layers which are interposed between the central layer and the respective inner and outer layers.

The adhesive layers may be of Admer, which is manufactured by Mitsui Petrochemical, Inc. and is a maleic anhydride grafted polypropylene copolymer. This structure can be given additional high barrier performance through the use of desiccants or oxygen scavengers in various layers as discussed in U.S. Pat. Nos. 4,407,897 and 4,425,410, herein incorporated by reference.

The closure 14 may be formed in any of a variety of ways which produce a high barrier component. The closure may be thermoformed using a layer structure similar to the PP-PE Blend/adhesive/EVOH/adhesive/PP-PE Blend structure of the container. The closure structure may also include additional layers, such as a layer of regrind.

As an alternative, the closure 14 may be insert injection molded around a disc of a barrier material which drops into open mold tools, as discussed in U.S. Pat. No. 4,149,838, herein incorporated by reference. Although the closure of FIG. 6a has thermoplastic material on both sides of the film, the thermoplastic can be injected on only one side of the film, since the thermoplastic can break through the film, either without or with a weakened area, as discussed in U.S. Pat. No. 4,230,659, herein incorporated by reference.

The barrier material may be either a single layer of thermoplastic material or a multi-layer laminate sheet material. The insert is preferably a laminate which includes a barrier layer of saran, EVOH or aluminum foil. A preferred barrier laminate is a coextruded or laminate film with layers of saran, adhesive and polypropylene when polypropylene is the thermoplastic that is injection molded to form the closure. In such an injection molded closure 14, the barrier insert may be either on the top or the bottom of the closure 14.

Figure 3:
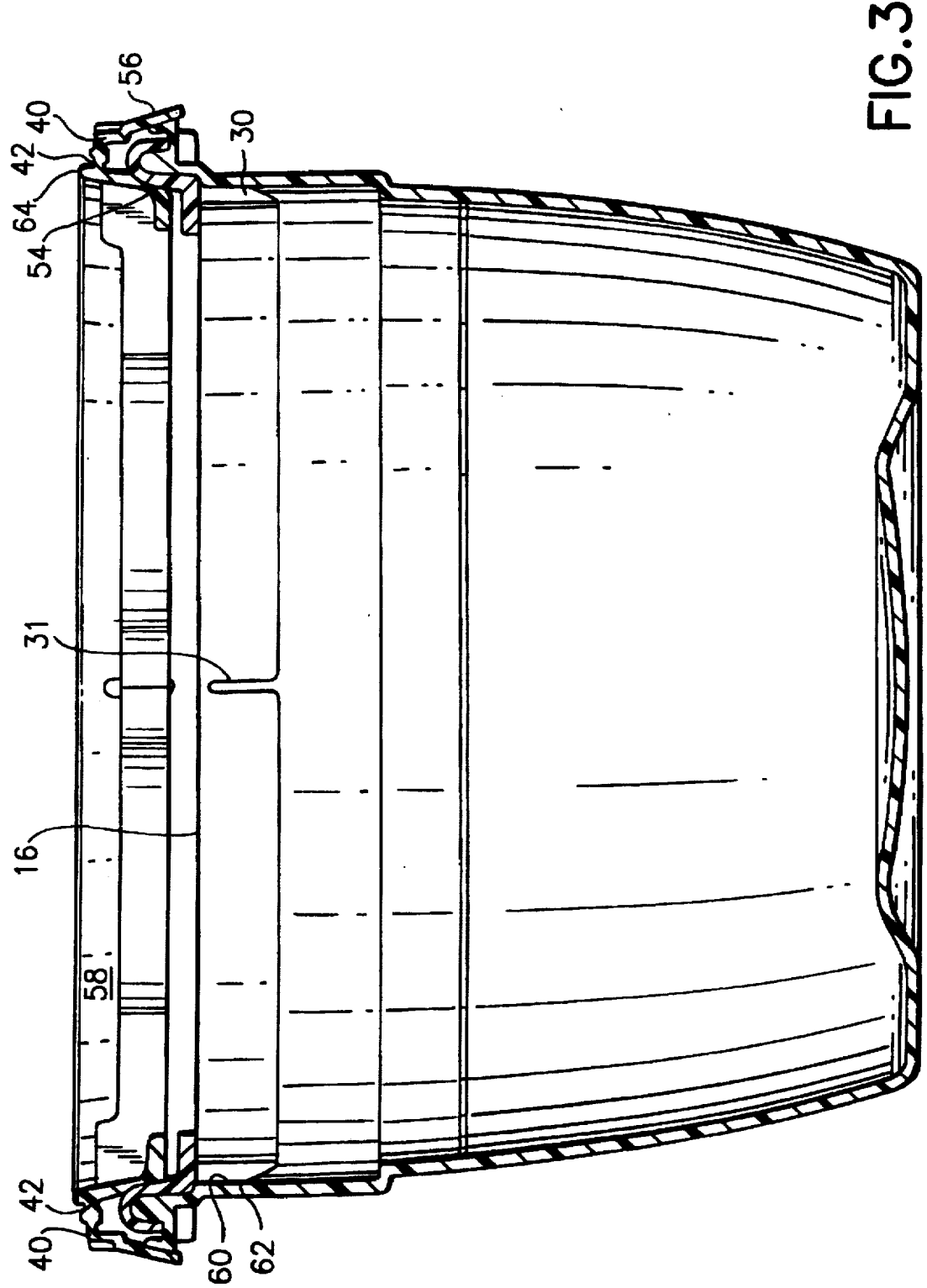
FIG. 3 is a cross-sectional view of the first embodiment along lines 3—3 of FIG. 2.

FIG. 6a shows an injection molded closure 14 with the barrier film 34 on the bottom of the closure 14 and the skirt 30 extending from the bottom of the film 34. The purpose of the closure skirt 30 is to maintain the closure in alignment with the inner surface 21 of the container sidewall 20 as the closure moves up and down within the container 12 during heating. The skirt 30 includes slits 31, as shown in FIG. 3.

As the closure 14 rises upon heating in the microwave, the steam escapes through the slits 31. The peripheral portion 28 of the closure is an inverted U-shape with a gasket 32 positioned between the peripheral portion 28 and the container annular post 36, as shown in FIG. 6a. As the ring 18 is affixed to the closure 14 and container 12, it is forced into engagement with those components to create sealing interfaces between the ring and container at interface 54 and between the ring and closure at interface 56. FIG. 6a shows that the container 12 includes a stop surface, here the upper surface of annular post 36 and/or of container sidewall step 21A, and that closure 14 has an engaging surface, here the undersurface of closure peripheral portion 28 and/or the undersurface at the periphery of the closure central panel portion where it joins upstanding wall 15. As shown in FIG. 4, once the container is opened, the container sidewall stop surface engages the closure engaging surface to prevent the closure from dropping or falling further into the container. As shown in other Figures of the drawings, the stop and engaging surfaces can be any suitable surfaces which function cooperatively as described.

The gasket 32 is compressed between the closure 14 and the container 12 when the two are affixed together by the ring 18. One purpose of the gasket is to limit oxygen ingress. It is possible for oxygen to pervade the ring at the score lines 40 and 42 since approximately less than 0.010 inches of residual polypropylene remains. The gasket 32 as positioned in FIG. 6a prevents the ingress of oxygen from the score lines to the contents of the food.

The gasket 32, which may be of styrene butadiene rubber, maintains the package's hermetic seal. In particular, a suitable material for the gasket is 480T, made by Dewey and Almy. Because this compound may adhere to the container when the package is opened and the closure removed, a thin layer of a lubricant 33, such as lecithin or another unsaturated fat or oil, is placed on the container 12 adjacent the opening 26 so that the gasket 32 mates with the lubricant. The gasket arrangement is described in more detail in a copending application entitled "Improved Oxygen Scavenging Composition and Container Made Therefrom," identified as Docket PA1148, which is owned by the same assignee as this invention and is herein incorporated by reference.

Figure 6B:
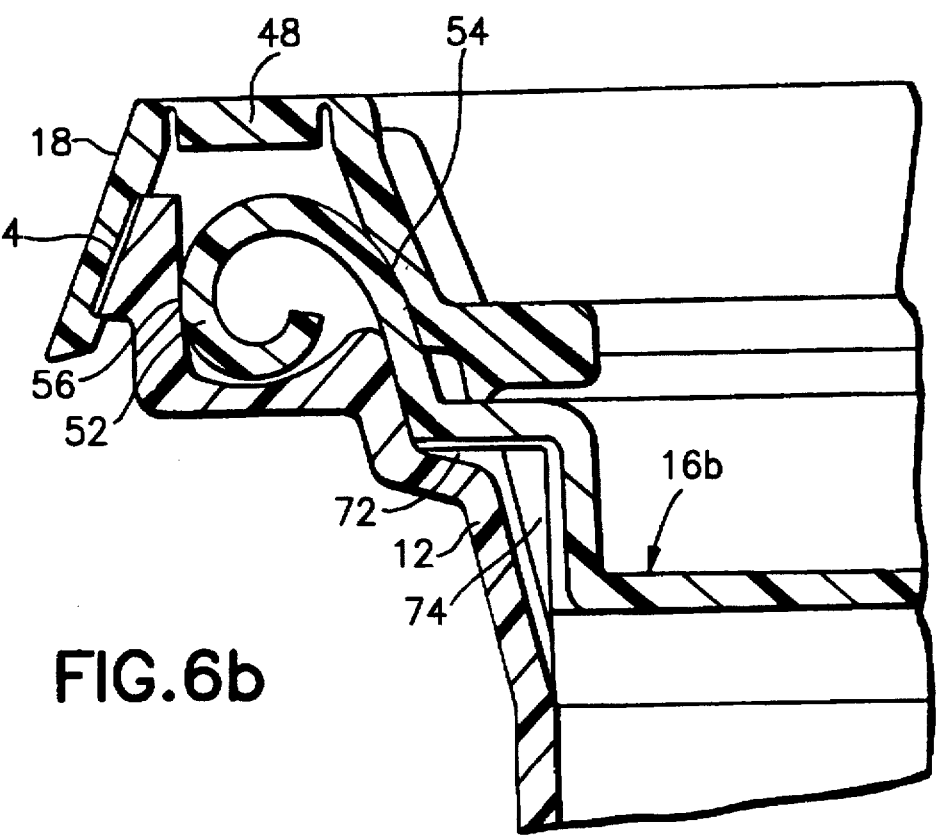
FIG. 6b is a cross-sectional view of the tear-strip and sealing locations of an alternative closure and container configuration of the first embodiment.

In lieu of the gasket 32, the closure may have an annular curl 52 aided by silicone grease to form the closure/container sealing interface 56, as shown in FIG. 6b. The closure of FIG. 6b is tightly sealed in the container opening 26 by compressive forces on the annular curl 52. The ring 18 is then welded to both the closure 14 and container 12. FIG. 6b also shows the dropped central panel 16b which contacts the food to maintain the closure in position during heating and food expansion.

In the first embodiment, as shown in FIGS. 1 through 6a, the ring 18 includes a tearing portion 38 which includes a tear strip 48 and two score lines, 40 and 42, which are positioned at the top of the ring. The ring 18 also includes an annular abrasion post 64 which allows the containers to be conveyed upside down without damaging the score lines 40 and 42. Ring 18 also includes a strengthening rib 66 to enable the tear strip 48 to be removed without breaking.

To open the package, the user pulls the ring starting tab 46 tearing through the sealing interface 56, then tears to the tear strip 48, pulling upward and around the container to completely remove the tear strip 48. The finishing point 50 of the tear strip is located on the outer score line 40 so that the panel is not pulled out during the removal of the tear strip.

After the package has been heated in the microwave, the cross pieces 58 are relatively cool while the closure central panel 16 is hot, so user grasps the cross pieces 58 to remove the closure. The cross pieces also provide a steady base for stacking one container onto the other.

When spin welding is the process for affixing the package components, it is desirable to hold the closure 14 and container 12 stationary with respect to one another while the ring 18 is being spin welded to the container and closure. One method of holding these components stationary is shown in FIG. 6a by means of an interlocking lug 70 on the container which engages with the peripheral finger 68 of the closure.

Another method of interlocking members is shown in FIG. 6b, by means of interlocking lugs 72 on the container and a mating interlocking lug 74 on the closure. A variety of modifications of these designs will also prevent rotation between the container 12 and closure 14.

Tabs 60 on the outside of the ring 18 provide a gripping surface for the spin welding machine to transmit force when spin welding the ring to the closure and container.

Spin welding is especially suitable for the first embodiment shown because it allows the container 12 and closure 14 to remain stationary with regard to one another, so that the gasket remains compressed therebetween, providing a tightly sealed package. This first embodiment also isolates the food within the container from any particles generated by the spin welding process.

The ring may also be welded to the container and central panel by other methods of welding known to the art, such as ultrasonic welding and RF sealing. Some modifications in the design may be required to practice these methods.

The progression of opening the package is shown in FIGS. 3–5. FIG. 3 shows a cross-sectional view of the closed package 10 of the first embodiment. FIG. 4 shows a cross-sectional view of the first embodiment with the tear strip 48 removed and the closure central panel 16 still in place on the container 12. FIG. 5 shows a cross-sectional view of the first embodiment with the closure 14 opened and the central panel 16 removed.

FIGS. 7 through 11 show a second embodiment of a microwavable package, generally referred to as 110. The second embodiment comprises a container 112 similar to the first embodiment and also a closure 114. The closure 114 may be injection molded with a barrier layer or thermoformed as discussed above. The closure 114 includes a central portion 116, surrounded by a peripheral lip 128 which is to be affixed to the container 112 at sealing interface 154, as shown in FIG. 8a. A separate ring member is not required in the second embodiment.

FIGS. 8b through 8d show the examples of locations of the sealing interfaces 54 and 56, respectively, between the ring and container and the ring and the central panel. The tear strip 48 is located inwardly of the sealing interfaces. The sealing interfaces and the tear strip 48 may be positioned at other alternative locations as well, so long as the tear strip is positioned inwardly of the sealing interface 54 between the ring and the container. A gasket, 132b and 132d, respectively, as shown in FIGS. 8b and 8d, may be positioned between the container 110 and the closure 114 to reduce oxygen ingress.

Figure 7:
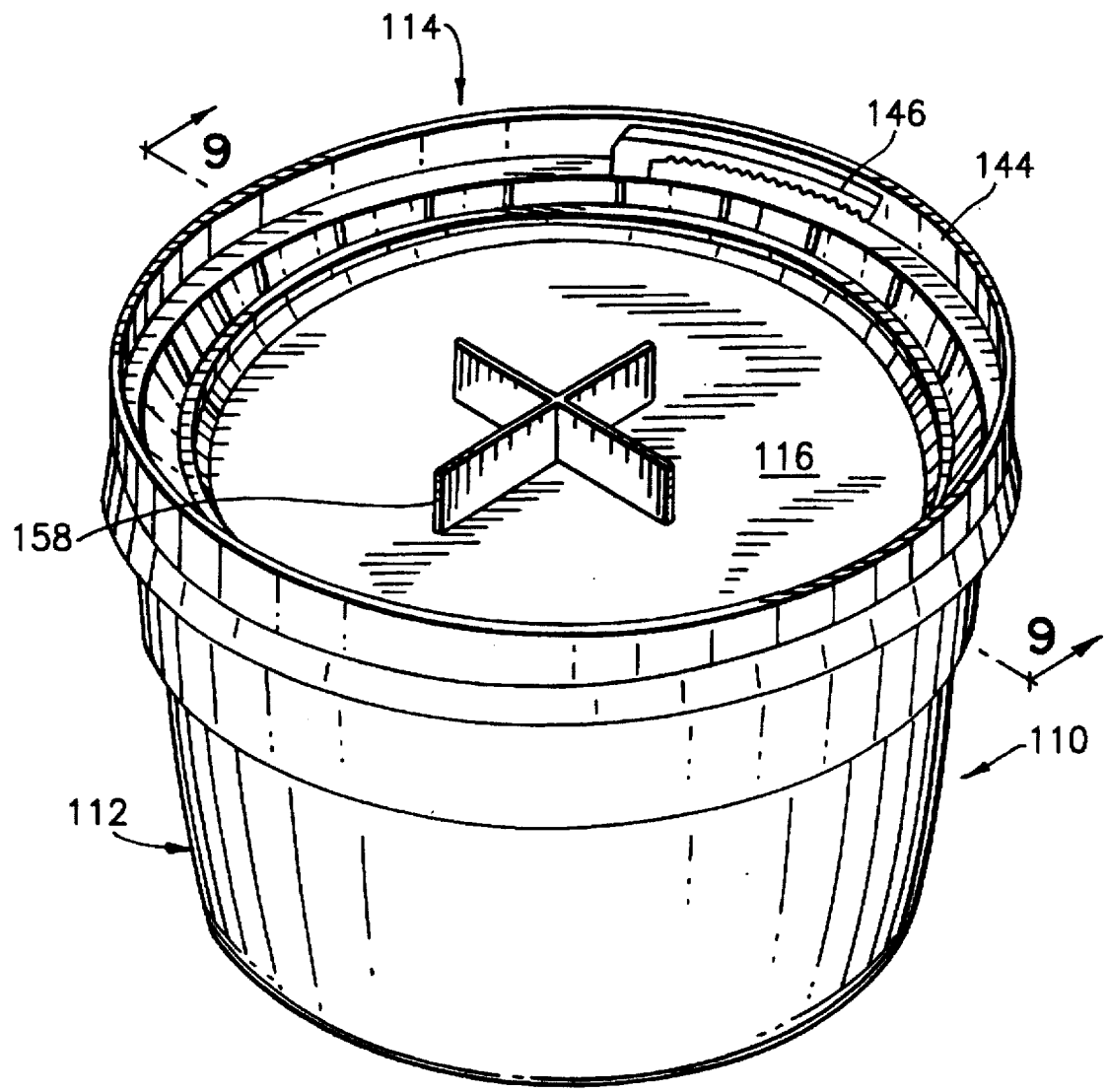
FIG. 7 is a perspective view of a second embodiment of the container and closure that is the subject of this invention.
Figure 10:
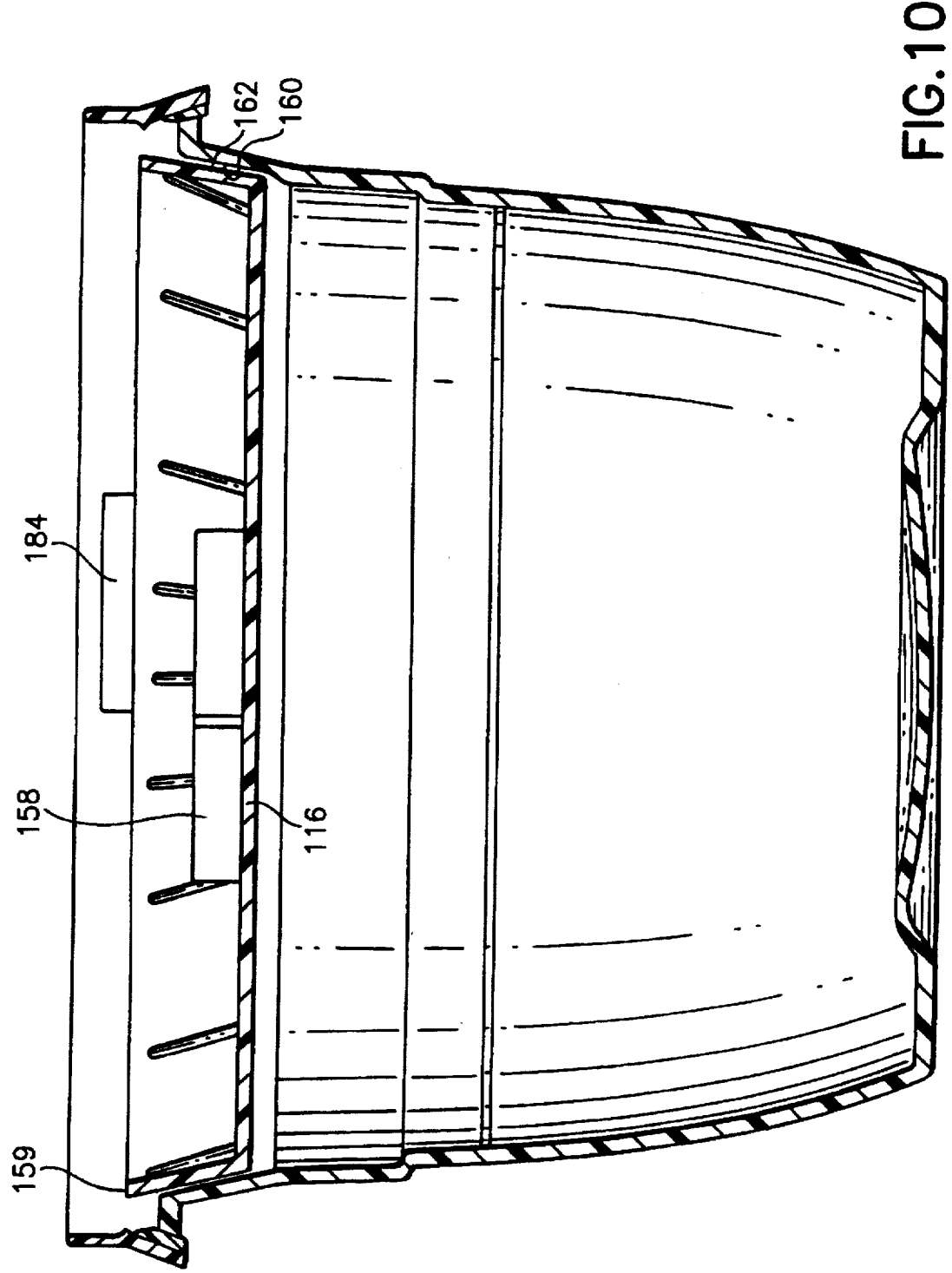
FIG. 10 is a cross-sectional view of the second embodiment of this invention with the closure opened using the tearing portion, and with the closure in position on the container.

FIG. 7 shows a one piece closure with a starting tab 146 of an alternative design, which may also include an upwardly extending ledge 144 to protect the tab from damage during handling. The simultaneous molding of the starting tab 146 and ledge 144 requires a slit 184, as shown in FIG. 10, for removing mold steel. The cross piece 158 is of a different design than shown in the first embodiment, but still remains cool during heating to allow one to comfortably remove the closure.

The preferred method of affixing the closure 114 of the second embodiment to the container 112 is to utilize ultrasonic welding to seal the closure 114 to the container 112 around the peripheral lip of the closure. 8b and 8d show versions of the second embodiment of this invention which are particularly suited for ultrasonic welding. Ultrasonic welding requires large equipment movable in the vertical direction to exert pressure in the vertical direction against two surfaces, here the peripheries of the closure and container, which can be placed on a horizontal mandrel.

Figure 8A:
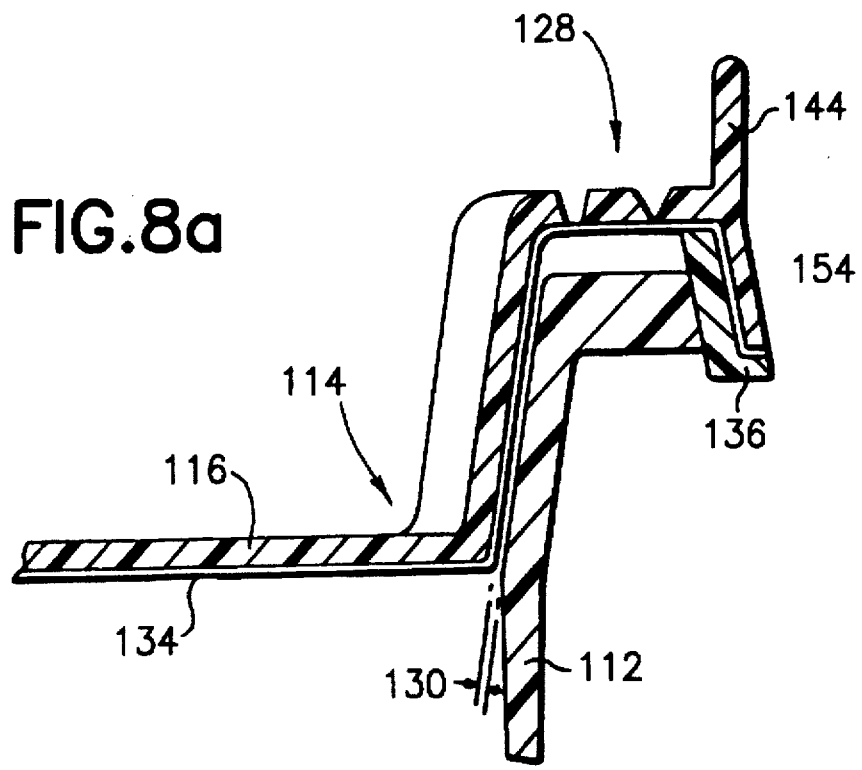
FIG. 8a is a cross-sectional view of the preferred container and closure sealing configuration of the second embodiment.

An alternative method of sealing the package of the second embodiment is to spin weld the closure 114 to the container 112. In this alternative of the second embodiment, as shown in FIG. 8a, the closure preferably is injection molded on a barrier film 134 so that the scores on the resulting closure are on top of the barrier film. The barrier film 134 substantially covers the entire undersurface of closure 114.

It has been discovered that spin welding a container to the barrier film 134 on the underneath side of the closure will cause the barrier film to be absent in certain areas of the closure. This allows easy ingress and egress of oxygen, substantially reducing the shelf life of the package. The container 112 and the closure 114 are designed so that a gap 130 exists between the two except at the collar 136 to prevent the container from contacting the barrier film 134 during spin welding.

Collar 136 is injection molded onto the periphery of the underneath side of the closure. The collar 136 is preferably of a material with a similar structure to the container so that the spin welding seal will be stronger. For example, if the outer layer of the container is a PP/PE Blend, then the collar may be of a PP based homopolymer.

One of the other known methods of sealing that is particularly appropriate for use with the second embodiment is RF sealing. RF sealing requires an electro-magnetically active sleeve, such as is commercially available under the tradename "EMAWELD". This sleeve 180 is placed around the opening end of the container with the closure then placed over the sleeve 180, as shown in FIG. 8c. The package assembly is then placed in a high intensity, high frequency electromagnetic field to RF seal the assembly. The sleeve 180 welds together the container and closure.

Figure 9:
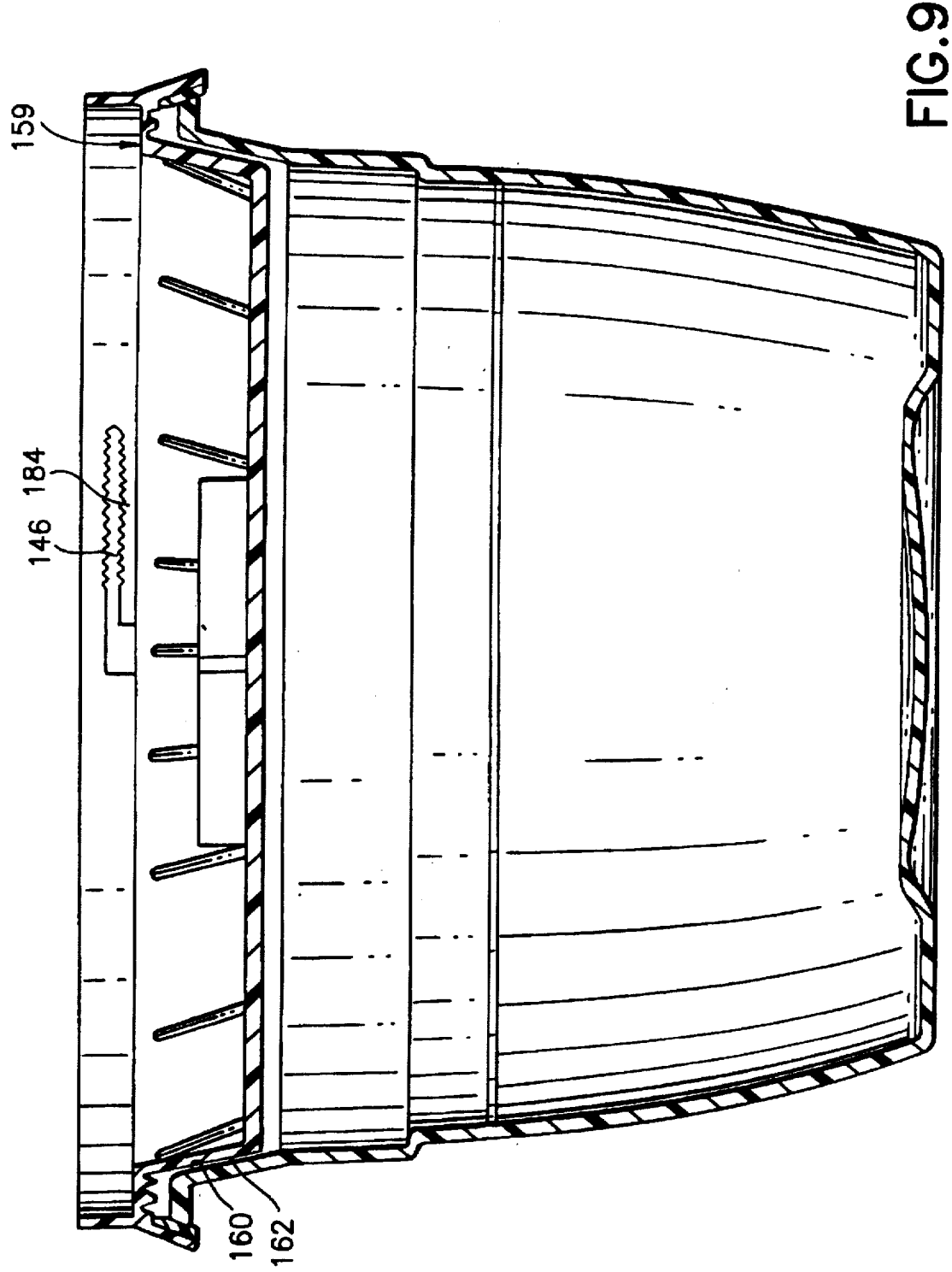
FIG. 9 is a cross-sectional view of the second embodiment of this invention taken across lines 9—9 of FIG. 7.

FIG. 9 depicts the cross-section of the closed package that is the second embodiment of this, while FIG. 10 shows the second embodiment after the tear strip has been removed and the closure central portion remains in position on the container.

Figure 11:
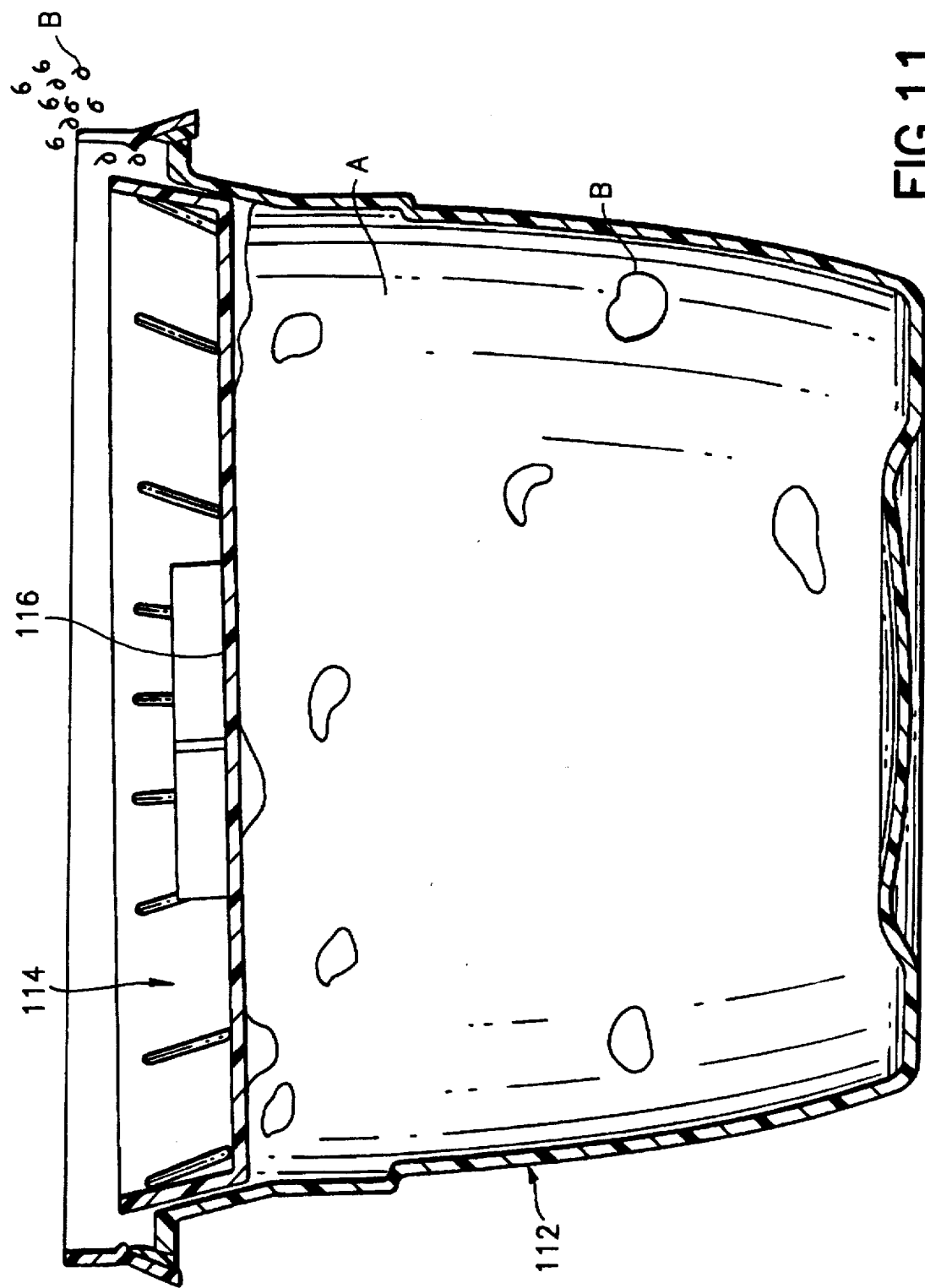
FIG. 11 is a cross-sectional view of the second embodiment of this invention during the heating process, with food shown in the container.

FIG. 11 shows the second embodiment package during the heating process. The food A contacts the central portion 116 forcing the lid to move upwards as the food expands. The steam bubbles B are the result of superlocalized heating and do not occur in conventional heating. The apparent expansion of the food during heating is a result, to a small part, of the change in density of the food, but to a much greater extent is the result of the appearance of steam bubbles B. This expansion of the food pushes the lid up. Eventually, the steam bubbles rise to the top and escape between the container and closure. Because of the loose fit and the relative shapes of the closure 114 within the container 112, steam can escape around the periphery of the closure 114. The food may also serve to restrain the closure from being ejected from the mouth of the container during the bumping which occurs during the microwave heating. The food may contact the central panel or a downward extension thereof in all of the embodiments described herein.

To achieve this bobbing phenomena, the closure 114 must fit loosely within the container 112. Additionally, the container and closure must have mating surfaces, 160 and 162, respectively, such as shown in FIG. 10, that have angles to vertical that are substantially equal to one another. This allows the closure 114 to return to its position within the container without severe cocking, which would leave a large gap that would allow food to splatter during heating.

The closure and container must also be designed to provide a certain amount of overlap between the container mating surfaces 160 and the closure mating surface 162, which move with respect to one another. This overlap should be approximately 0.2 inches or more, and is preferably greater than 0.3 inches and can be achieved partly or wholly by recessing the central panel into the container opening. This overlap can be approximated by measuring the recess of the central portion or central panel from an upper horizontal surface 159 of the closure 114.

However, if the closure includes a piston skirt such as shown in the first embodiment in FIG. 3, the recess of the central panel may be reduced because the closure mating surface 62 is extended by the closure skirt 30. Overall, the overlap of the closure mating surface 62 and the container mating surface 60 should be 0.2" or more, and it is preferably greater than 0.3". The piston skirt also minimizes food entrapment between the two mating surfaces. Such trapped food becomes baked on during heating, causing a negative consumer reaction.

Figure 12:
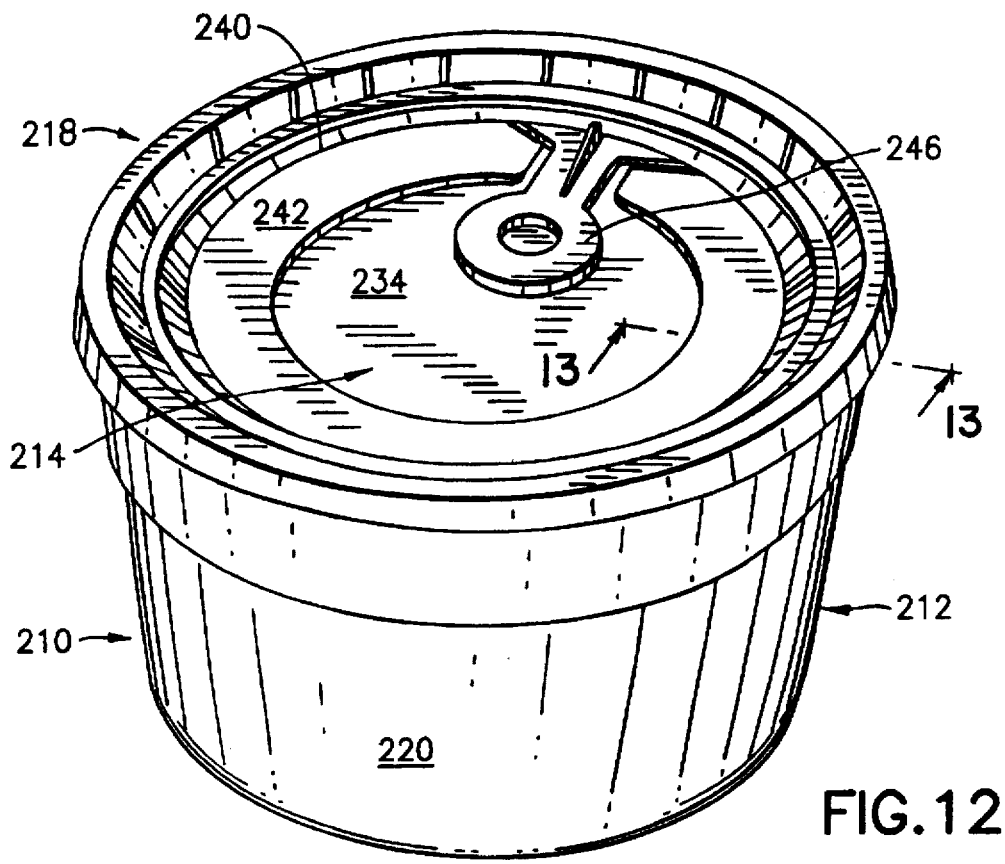
FIG. 12 is a perspective view of a third embodiment of the container and closure that is the subject of this invention.
Figure 13:
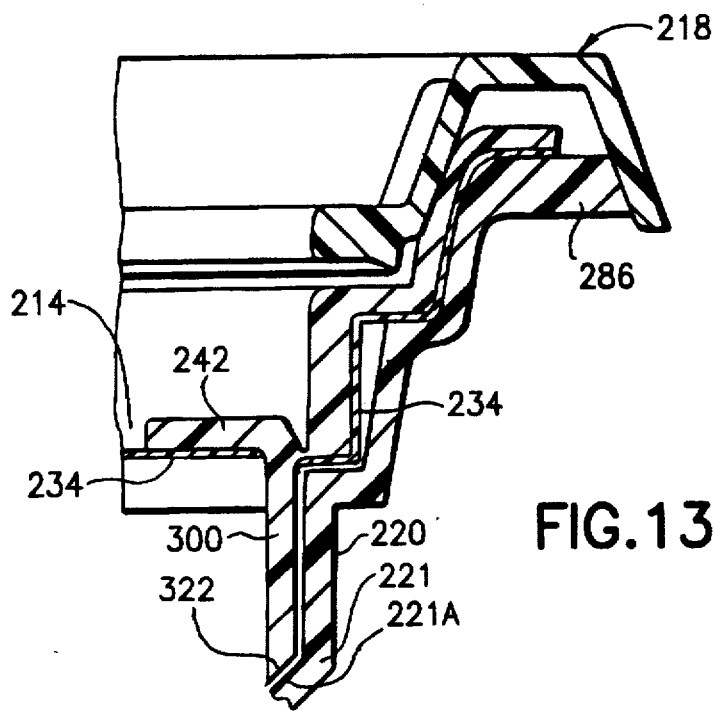
FIG. 13 is a cross-sectional view of the third embodiment taken along lines 13—13 of FIG. 12.

FIGS. 12 and 13 show a third embodiment of the microwavable package, generally identified as 210, that is the subject of this invention. The package 210 includes a container 212, a closure 214 and a ring 218. The container 212 includes a sidewall 220, a closed end, an end with an opening, and an outwardly extending flange 286.

The closure 214 and ring 218 of the third embodiment are similar to those of the first embodiment except that the tearing portion is on the closure 214 and not on the ring 218. The closure, which is a type of full panel easy-open end, has a tearing portion that comprises a circular score line 240 on the closure 214. Tearing is initiated by pulling on the starting tab 246 and pulling the central panel annular portion 242 and a portion of the barrier film 234 out of the package to reveal the contents of the package. The user then replaces the annular portion 242 and the barrier film 234 in the container during heating. FIG. 13 shows that container sidewall 220 has an inwardly angled portion 221 whose inner surface is a stop surface 221A, and that the skirt 300 of closure 214 has an engaging surface here shown as its bottom edge surface 322 which in this embodiment is disposed at an angle substantially equal to that of sidewall stop surface 221A to prevent the removable reclosable closure portion from dropping further into the container.

This third embodiment can be assembled by positioning the closure 214 within the container 212 and spin welding the ring 218 to both of those components.

Other embodiments of the invention are shown in a copending design application entitled "End Closure for a Container," Docket PA1108, which is owned by the same assignee as this invention and is herein incorporated by reference.

Those skilled in the art will see that certain modifications can be made to the apparatus and methods and the resulting structures as disclosed with respect to the illustrated embodiments, without departing from the spirit of the instant invention.

And while the invention has been described above with respect to its preferred embodiments, it will be understood that the invention is adapted to numerous arrangements, modifications, and alterations, which are intended to be within the scope of the appended claims.

We claim:

1. A closure for closing and loosely reclosing a food container, the container comprising a sidewall having an inner surface, an outer surface and an upper end portion, a closed end and an open end, the closure comprising a central panel having a top surface and a bottom surface, an outer peripheral upstanding wall adjoining the central panel and adapted to be affixed to the container sidewall, the central panel comprising an annular peripheral portion formed of a material and having a score line formed in the material and defining a removable central panel portion which includes pull means for tearing the score line and pulling the removable central panel portion from the rest of the closure and container, the removable central panel portion having a peripheral skirt adjacent the scoreline and extending downwardly from and below the bottom surface of the removable central panel portion, said closure skirt having an outer surface which is adjacent and alongside but spaced from a portion of the inner surface of the container sidewall to provide a loose fit therewith, the closure skirt outside surface and the adjacent sidewall inner surface portion being adapted to be in a mating, overlapping relationship, such that once a container closed by the closure is initially opened with the removable central panel portion remaining on or replaced on the container and the container and its food contents are heated, the removable central panel portion is free to move up and down within the container open end, and steam can escape from the container between the mated, overlapped portions of the closure skirt and container sidewall.

2. The closure of claim 1 wherein the score line is adjacent the peripheral upstanding wall and defines a full open central panel.

3. The closure of claim 1 wherein the closure skirt has slits extending therethrough to allow steam to escape through the slits from the inside of the container when the container and contents are heated.

4. The closure of claim 3 wherein the closure includes a ring surrounding and above a portion of the central panel, the ring having an inverted U-shape and having an upper panel portion, a depending inner skirt having an inner surface and a depending outer skirt having an inner surface, and wherein a portion of the ring inner skirt is affixed to a portion of the closure peripheral upstanding wall.

5. The closure of claim 3 wherein the score line is adjacent the peripheral upstanding wall and defines a full open central panel.

6. The closure of claim 1 wherein the closure includes a ring surrounding and above a portion of the central panel, the ring having an inverted U-shape and having an upper panel portion, a depending inner skirt having an inner surface and a depending outer skirt having an inner surface, and wherein a portion of the ring inner skirt is affixed to a portion of the closure peripheral upstanding wall.

7. The closure of claim 6 wherein the inner surface of the ring outer skirt is adapted to engage and be affixed to a portion of the upper end portion of the container sidewall.

8. The closure of claim 6 wherein the score line is adjacent the peripheral upstanding wall and defines a full open central panel.

9. The closure of claim 6 wherein the ring is affixed to the closure by spin welding.

10. A closure for closing and loosely reclosing a food container, the container comprising a sidewall having an inner surface and an outer surface and an upper end portion, a closed end, an open end and a stop surface associated with the sidewall, the closure comprising a central panel having a top surface and a bottom surface, an outer peripheral upstanding wall adjoining the central panel and adapted to be affixed to the container sidewall, a ring surrounding and being above a plane through a portion of the central panel, the ring having an inverted U-shape and having an upper panel portion, a depending inner skirt having an inner surface and a depending outer skirt having an inner surface, a portion of the inner surface of the ring inner skirt being affixed to a portion of the closure peripheral upstanding wall, and the ring upper panel portion including a tearing portion in the form of a peripheral tear strip defined by score lines formed in the material of the upper panel portion and pull means connected to the tear strip, the tear strip extending about the ring and defining within its bounds a removable portion of the closure which includes the central panel, the removable closure portion including an engaging surface adapted to engage the container stop surface to prevent the removable closure portion from dropping further into the container, the removable closure portion having a skirt extending downwardly from and below the bottom surface of the central panel, said closure skirt having an outer surface which is adjacent and alongside but spaced from a portion of the inner surface of the container sidewall to provide a loose fit therewith, the closure skirt outside surface and the adjacent sidewall inner surface portion being adapted to be in a mating, overlapping relationship, such that once the tear strip is torn to open the container and the container and its food contents are heated with the removable closure portion on the container, steam can escape from the container between the mated, overlapped portions of the closure skirt and container sidewall, and the removable closure portion is free to move up and down and yet remain within the container open end.

11. The closure of claim 10 wherein the inner surface of the ring outer skirt is adapted to engage and be affixed to a portion of the upper end portion of the container sidewall.

12. A package comprising:

a container comprising a sidewall having an inner surface and an outer surface, a closed end, an open end, a peripheral edge surrounding the opening, and a stop surface associated with the inner surface of the sidewall, a closure comprising a peripheral upstanding wall, a peripheral edge, a tearing portion and a central panel having a bottom surface and comprised of a barrier film and an annular portion, the closure having a peripheral skirt extending downwardly from and below the bottom surface of the central panel, the skirt having slits therethrough and having an outer surface which is adjacent and alongside but spaced from a portion of the inner surface of the container sidewall, a ring surrounding and being above the central panel, the ring having an inverted U-shape and having an upper panel portion, a depending inner skirt having an inner surface and a depending outer skirt having an inner surface, a portion of the inner skirt inner surface being affixed to a portion of the closure peripheral upstanding wall, and a portion of the outer skirt being affixed to the container sidewall adjacent the container peripheral edge, the closure tearing portion including at least one peripheral score line formed in the closure material and defining within the periphery of the at least one score line a removable closure portion which includes a portion of the central panel, the tearing portion being for opening the package to permit removal of the removable closure portion while leaving a portion of the ring outer skirt affixed to the container, the package being adapted such that after the container is initially opened and the removable closure portion remains on or is replaced on the container and the container and its contents are heated, steam can escape from the container between the closure skirt and container sidewall, and the removable closure portion is free to move up and down within the container open end.

13. The package of claim 12 wherein affixation of the ring to the closure and container is effected by spin welding.

14. The package of claim 12 wherein the adjacent outer surface of the closure skirt and adjacent container sidewall inner surface portion are adapted to have a mating, overlapping relationship and have angles to the vertical which are substantially equal to one another.

15. The package of claim 14 wherein the overlap of the closure skirt and sidewall portion is about 0.2 inches or more.

16. The package of claim 15 wherein the overlap of the closure skirt and sidewall portion is about 0.3 inches.

17. A microwavable package comprising:

a container comprised of a closed end, a sidewall and an open end, a closure hermetically sealed to the container and having a recessed portion which includes a central panel portion and is adapted to fit within the container open end, a removable portion which includes a portion of the central panel portion and which closes and is for reclosing the open end of the container, a barrier film having on its upper surface a central panel annular portion, the removable closure portion having a peripheral skirt extending downwardly from and below the bottom surface of the reclosable closure portion into the container, the skirt being adapted to provide a gap between the closure skirt and an adjacent portion of the sidewall of the container so that the reclosable closure portion fits loosely within the open end of the container, such that once the container is opened and the removable closure portion remains on or is replaced on the container reclosing its open end, and the container and its contents are heated, steam can escape from the interior of the container between the skirt and the container sidewall, and the removable closure portion is free to move up and down within the container opening.

18. The package of claim 17 wherein the container sidewall includes an inwardly directed stop surface, and the removable closure portion includes an engaging surface adapted to engage the stop surface to prevent the removable closure portion from dropping further into the container.

19. A microwavable package as claimed in claim 17 wherein in the initially closed container, the distance between the closure central panel and the uppermose surface of the container is greater then approximatley 0.2 inches.

20. A microwavable package as claimed in claim 17 wherein the container sidewall defines a mouth, the sidewall comprises a mating portion adjacent the mouth, and the closure comprises a mating portion surrounding the recessed portion, wherein the closure mating portion has an angle to the vertical and the container mating portion has an angle to the vertical, and said angles are substantially identical.

21. A microwavable package as claimed in claim 17 wherein the closure recessed portion comprises a substantially flat panel and a lower extension that contacts the food or drink.

22. A microwavable package as claimed in claim 17 wherein the container comprises a first sidewall portion adjacent the open end, the first sidewall portion having a predetermined angle to vertical, the closure having a sidewall surrounding the recessed portion, the closure sidewall having an angle to vertical substantially equal to the angle of the first sidewall portion of the container.

23. A microwavable package as claimed in claim 17 wherein the closure additionally comprises a peripheral skirt extending downwardly from the recessed central panel portion, the skirt having a diameter less than the diameter of the container opening.

24. The package of claim 17 wherein the skirt has slits therethrough to allow steam to pass therethrough and escape from the container.

25. The package of claim 24 wherein the adjacent outer surface of the closure skirt and adjacent container sidewall inner surface portion are adapted to have a mating, overlapping relationship and have angles to the vertical which are substantially equal to one another.

26. The package of claim 25 wherein the overlap of the closure skirt and sidewall portion is about 0.2 inches or more.

27. The package of claim 26 wherein the overlap of the closure skirt and sidewall portion is about 0.3 inches.

28. A. package comprising:

a container comprising a sidewall having an inner surface, a mouth defined by the inner surface, a closed end, an open end, and a stop surface associated with the side wall, a closure for hermetically closing and loosely reclosing the container, the reclosable closure comprising a central panel, an annular central panel portion, a peripheral wall having at least an upstanding portion, the central panel including a barrier film, a ring surrounding the closure and having a first portion affixed to the closure and a second portion affixed to the container, a tearing portion defined by at least one score line formed in the closure material, the at least one score line defining a removable closure portion of the central panel portion which includes at least a portion of the central panel and an engaging surface adapted to engage the container stop surface to prevent the removable closure portion from dropping further into the container, and a peripheral skirt extending downwardly from and below the bottom surface of the central panel, the skirt being peripheral to but part of the removable closure portion and the having an outer surface which is adjacent and alongside but spaced from a portion of the inner surface of the container sidewall to provide a loose fit therewith, the closure skirt outside surface and the adjacent sidewall inner surface portion being adapted to be in a mating, overlapping relationship, such that once a closed container is initially opened with the removable closure portion remaining or replaced loosely on the container and the container and its food contents are heated, the removable central panel portion is free to move up and down within the container open end, and steam can escape from the container between the mated, overlapped portions of the closure skirt and container sidewall.

29. The package of claim 28 wherein the closure skirt has slits extending therethrough to allow steam to escape through the slits from the inside of the container when the container and contents are heated.

30. A package as claimed in claim 28 wherein the tearing portion is positioned inwardly of the ring.

31. A package as claimed in claim 28 wherein the central panel is adapted to contact food contents that may be placed within the container prior to assembling the package.

32. A package as claimed in claim 28 wherein the tearing portion is a full panel easy open end.

33. The package of claim 28 wherein affixation of the ring to the closure and container is effected by spin welding.

34. The package of claim 28 wherein the closure ring has an inverted U-shape comprised of an upper panel portion, a depending inner skirt having an inner surface and a depending outer skirt having an inner surface and wherein a portion of the ring inner skirt is affixed to a portion of the closure peripheral upstanding wall.

35. The package of claim 34 wherein the at least one score line is adjacent to but interior of the peripheral upstanding wall and defines a full open central panel.

36. The package of 28 wherein the closure includes a ring surrounding and above a portion of the central panel, the ring having an inverted U-shape and having an upper panel portion, a depending inner skirt having an inner surface and a depending outer skirt having an inner surface and wherein a portion of the closure peripheral upstanding wall, and a portion of the ring outer skirt is affixed to the container.

37. A package as claimed in claim 36 wherein the ring is affixed to the container and to the closure by spin welding.

38. The package of claim 36 wherein the at least one score line is formed in the ring, between the affixed inner and outer skirts.

39. The package of claim 38 wherein the at least one score line is formed in the ring upper panel.

40. A microwavable package comprising:

a container comprising a closed end, a sidewall and an open end, the opening having a diameter, a closure sealed to the container and having a recessed central panel portion having a diameter less than the diameter of the container opening an upstanding peripheral wall, and a barrier film, the barrier film having on a portion of its upper surface an annular central panel portion, a ring surrounding the annular central panel portion, the ring having a first portion affixed to the upstanding wall and a second portion affixed to the container, the closure including a peripheral skirt extending downwardly from and below the annular central panel portion and barrier film, the skirt being sized to fit loosely within the container opening and having slits through the skirt, such that after the closed container is initially opened and the recessed central panel portion remains or is replaced in the container opening to thereby loosely reclose the container, and the container and its contents are heated, steam can escape from the container through the slits and between the closure skirt and container sidewall as the central panel portion rises and falls within the container open end during heating.

41. The package of claim 40 wherein affixation of the ring to the closure and container is effected by spin welding.

* * * * *